US 008214546B2

(12) United States Patent
Vasudevan et al.

(10) Patent No.: US 8,214,546 B2
(45) Date of Patent: Jul. 3, 2012

(54) MODE SWITCHING (75) Inventors: Sripriya P. Vasudevan, Issaquah, WA (US); David J. Rasmussen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 12/607,249

(22) Filed: Oct. 28, 2009

(65) Prior Publication Data

US 2011/0099299 A1    Apr. 28, 2011

(51) Int. Cl.
*G06F 3/00* (2006.01)
(52) U.S. Cl. .......................................................... 710/14
(58) Field of Classification Search .................. None
See application file for complete search history.

(56) References Cited

U.S. PATENT DOCUMENTS

| 5,386,219 | A  | * | 1/1995 | Greanias et al. | 345/174 |
| 6,738,834 | B1 | * | 5/2004 | Williams et al. | 710/8 |
| 7,522,065 | B2 |   | 4/2009 | Falcon | 340/686.6 |
| 2003/0174125 | A1 |   | 9/2003 | Torunoglu et al. | 345/168 |
| 2005/0179647 | A1 | * | 8/2005 | Simmons et al. | 345/156 |
| 2008/0030470 | A1 |   | 2/2008 | Rensberger et al. | 345/163 |
| 2008/0224995 | A1 | * | 9/2008 | Perkunder | 345/157 |
| 2009/0027354 | A1 |   | 1/2009 | Perski et al. | 345/173 |
| 2009/0191854 | A1 |   | 7/2009 | Beason | 455/418 |

OTHER PUBLICATIONS

Davis et al., "Automatic Switching Stylus for Pen-Based Computer Systems," Mar. 21, 2005, IP.com, pp. 1-3.*
Jun Rekimoto, "ThumbSense: Automatic Input Mode Sensing for Touchpad-based Interactions," CHI 2003, Apr. 5-10, 2003, ACM 1-58113-637-Apr. 2, 0004, 2 pgs., http://www.sonycsi.co.jp/person/rekimoto/papers/chi03tsense.pdf.
Mike Tholfsen, "OneNote and Education,", Jul. 16, 2009, 21 pgs., http://blogs.msdn.com/onenote_and_education/.
Jeff Cardon, "OneNote Tips & Tricks," Apr. 24, 2008, 2 pgs., http://onenotetips.blogspot.com/2008/04/onenotes-user-base-has-been-steadily.html.

* cited by examiner

*Primary Examiner* — Eron J Sorrell
(74) *Attorney, Agent, or Firm* — Merchant & Gould (57) ABSTRACT

Mode switching may be provided. A selection of a non-native mode for a first input device may be received having a native mode. Then the use of the first input device may be enabled in the selected non-native mode. Next, a switch may be detected from the first input device to a second input device and then a switch back to the first input device may be detected. The use of the first input device may be enabled in the native mode in response to detecting the switch back to the first input device.

20 Claims, 4 Drawing Sheets

```
Algorithm:
//Initialize the current input device as mouse.
CurrentInputDevice = Mouse // ModeButtonPressedinRibbon refers to the user explicitly selecting a
particular mode through the ribbon menu. // Ex: If Pen is selected in the
ribbon, then ModeButtonPressedInRibbon would be pen and the
corresponding mode would be ink mode.

If (ModeButtonPressedinRibbon)
{
    // Current mode is set to the user's choice made through the ribbon
    Current Mode = ModeButtonPressed;

// The application then enters the mode that the user selected and
    the application waits for the user to use one of the input devices (pen,
    cursor, keyboard or finger). This wait is denoted by
    WaitinForInputDevice flag.
    CurrentInputDevice = WaitingForInputDevice;
}

// The following loop is executed for every input device event received.
If (InputDevice != CurrentInputDevice)
{
    // If the application is not waiting for input device after the user has
    explicitly selected a mode in the ribbon, then the following code is
    executed.
    If (Not (CurrentInputDevice == WaitingForInputDevice))
    {
        // The mode is based on the input device's native mode. i.e., pen
        = ink; finger = pan; keyboard/cursor = cursor;
        Current Mode =Native mode for Input Device;
    }
    // Set current input device as the input device being used.
    CurrentInputDevice = InputDevice;
}
```

MODE SWITCHING

BACKGROUND

An input device is any peripheral (e.g. a piece of computer hardware equipment) used to provide data and control signals to an information processing system such as a computer. Natural interaction with computers has become increasingly popular in recent times and users have come to expect sophisticated, yet simple interaction models from their everyday devices and applications.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Mode switching may be provided. A selection of a non-native mode for a first input device may be received having a native mode. Then the use of the first input device may be enabled in the selected non-native mode. Next, a switch may be detected from the first input device to a second input device and then a switch back to the first input device may be detected. The use of the first input device may be enabled in the native mode in response to detecting the switch back to the first input device.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Mode switching may be provided. Natural interaction with computing devices has become increasingly popular in recent times and users have come to expect sophisticated, yet simple interaction model from their everyday devices and applications. With the introduction of new input devices, fingers for example, existing sets of input devices that must be supported have expanded.

Modes of operation for input devices are based on a combination of an input device type and how a user wants to use the input device. For example, the user can choose finger as the input device and could either want to pan or scroll using the finger or ink using finger. If the user does not select a particular operation mode for an input device, then an application, for example, may determine the operation mode based on a default usage for the input device. Default usages for input devices may be set in their corresponding "native modes" when a particular operating mode associated with the input devices boots up. "Non-native" modes may comprise modes of operation that are not set to input devices when a particular operating mode associated with the input devices boots up.

Conventional systems have prevented input devices from being used in non-native modes or have allowed only a manual user prompted switch between the different operating modes. For example, conventional systems do not allow finger to ink or have been very "sticky" with respect to the user's mode selection. With conventional systems, for example, the user would choose to ink with a cursor and the application would stay in that mode until the user explicitly changes the mode selection. Embodiments of the present invention may give a middle ground that allows input devices to be used in non-native input modes, but may also takes care of common user cases where the application should revert back to native mode for an input device for a natural and intuitive user experience.

Figure 1:
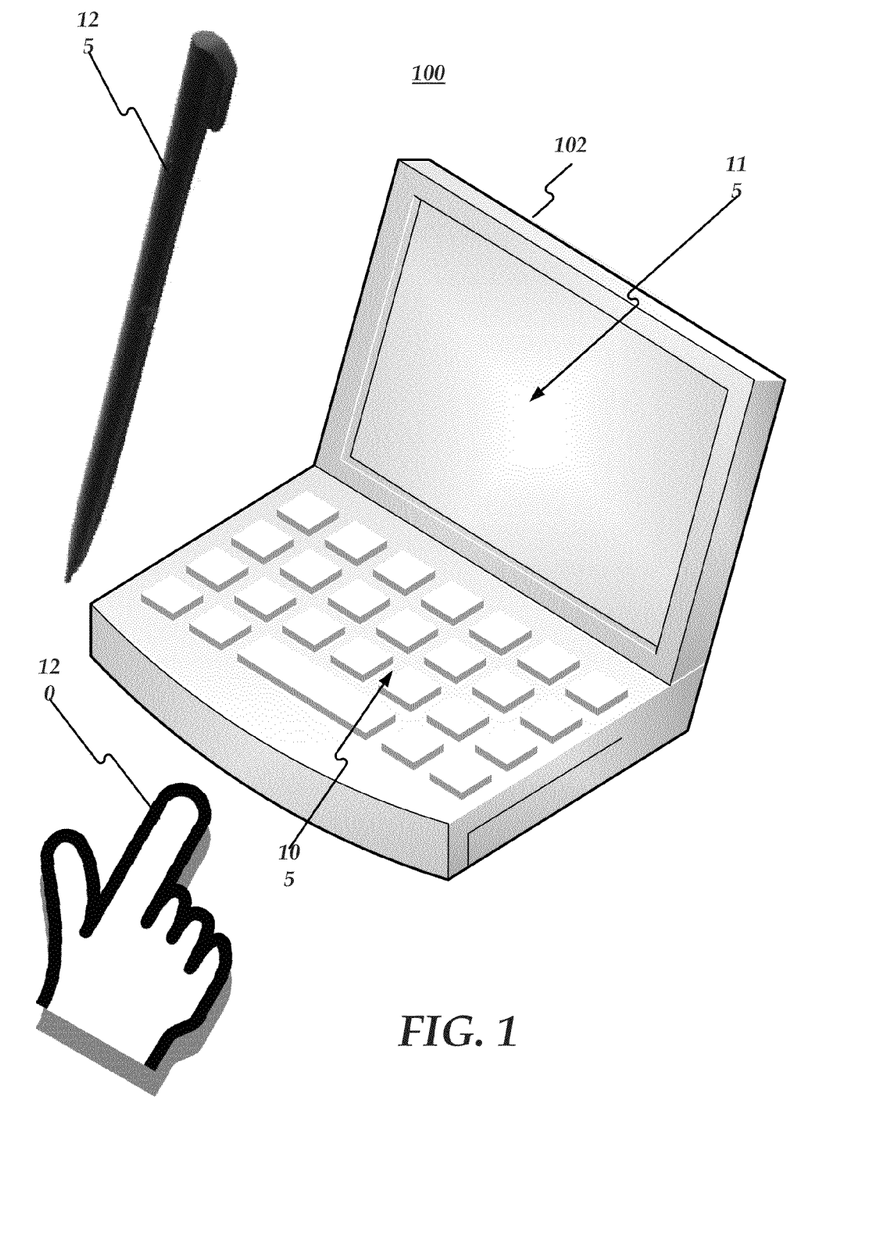
FIG. 1 is a block diagram of an operating environment.

FIG. 1 is a block diagram of an operating environment 100 consistent with embodiments of the invention. As shown in FIG. 1, environment 100 may include a device 102, a finger 120, and a pen 125. Device 102 may comprise, but is not limited to, a mobile terminal, a smart phone, a cellular telephone, a wireless telephone, a personal digital assistant (PDA), an intelligent pager, a portable computer, a hand held computer, a conventional telephone, and a facsimile machine. Finger 120 may be associated with a user of device 102. Device 102 may include a keypad 105 and a screen 115. An auto-mode behavior of an application running on device 102 may be dependent on the input for device 102. If a cursor is the input device, then the application may be in cursor mode (e.g. cursor behavior.) If pen 125 is detected as the input device, then the application may enter an ink mode (e.g. pen behavior.) And if finger 120 is detected, then the application may be in pan mode (e.g. hand tool for panning.) Consistent with embodiments of the invention, the user can change this native mode behavior for any input device by explicitly picking a mode of operation through, for example, a ribbon user interface on screen 115 that may tell the application that the next input device will be used in a particular mode of operation.

Consistent with embodiments of the invention, the application may revert back to a native mode for any input device as soon as the input device changes again. For example, the user can select a mode of operation and then use the input device immediately following the mode selection operation in that mode. If the user changes the input device again, the application may go back to the native mode for the currently being used input device. A native mode of operation may comprise an initial mode of operation assigned to a particular input device when device 102 is first booted. A non-native mode of operation may comprise an initial mode of operation not assigned to a particular input device when device 102 is first booted. The non-native mode or the native mode may comprise, but is not limited to cursor mode, ink mode, pan mode, or text mode. Moreover, the input device may comprise, but is not limited to a mouse, a pen, a finger, or a keyboard. Consistent with embodiments of the invention, any input device and any mode of operations may be used.

Figure 2:
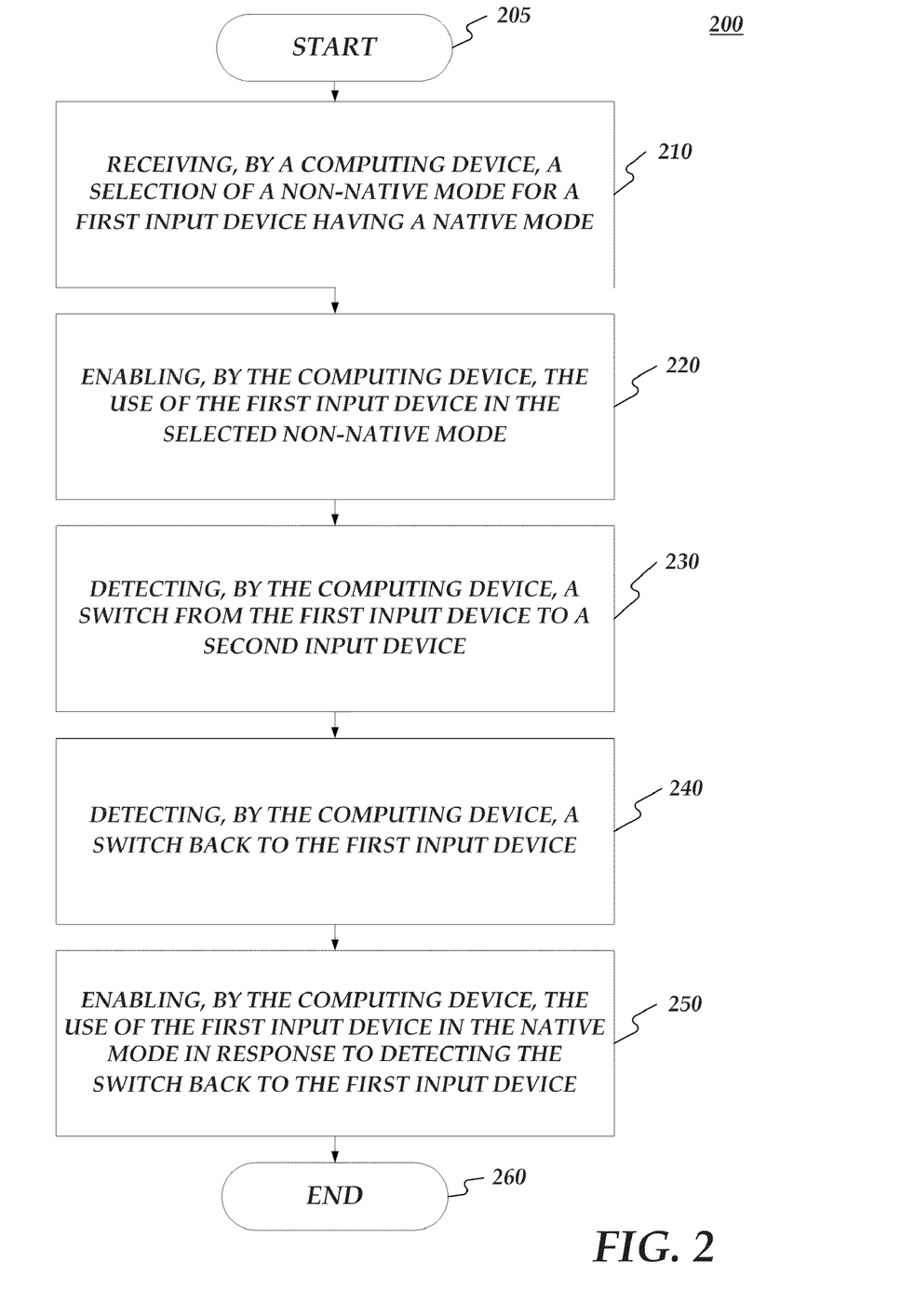
FIG. 2 is a flow chart of a method for providing mode switching.
Figure 3:
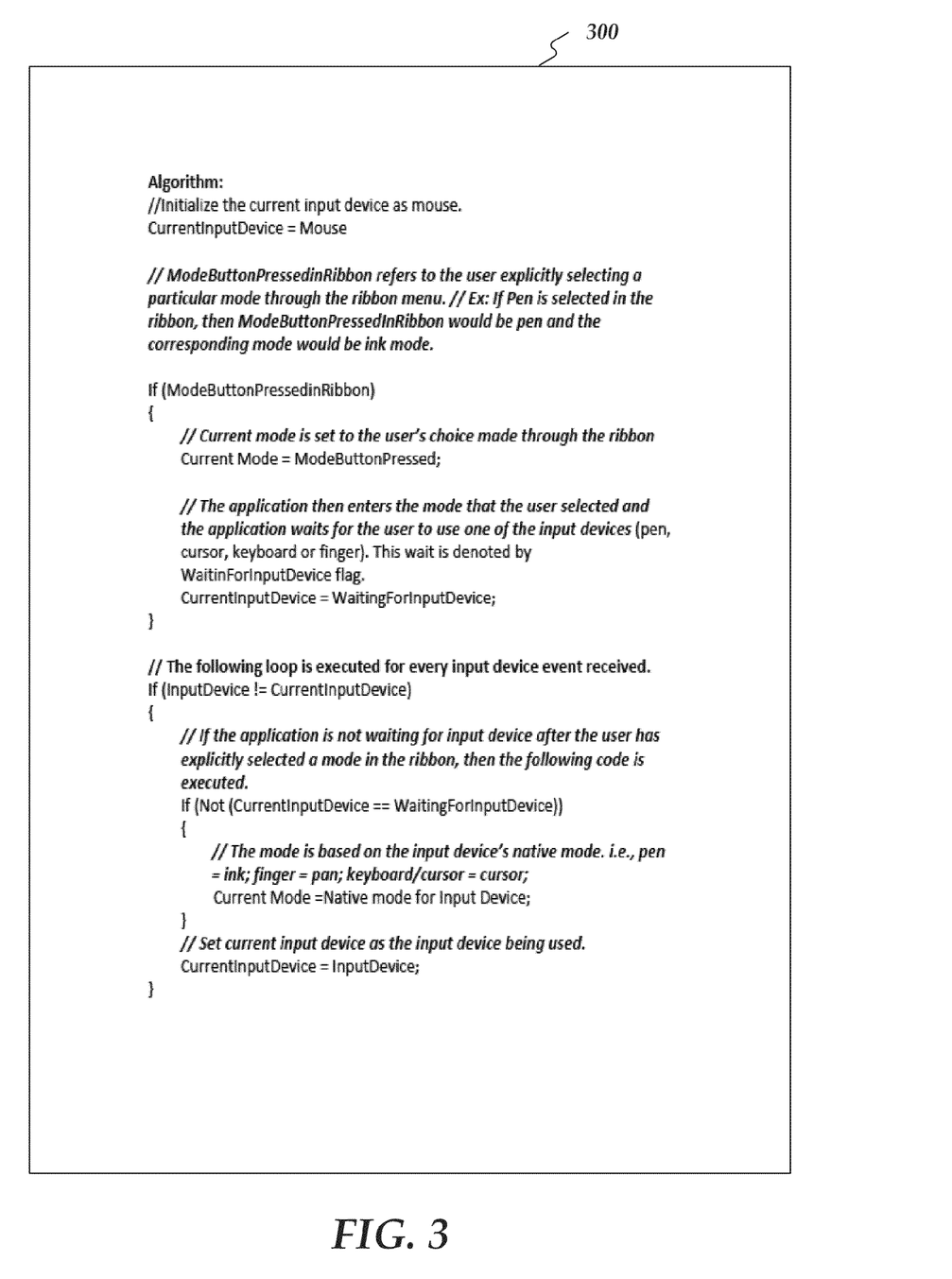
FIG. 3 is a diagram illustrating a mode switching algorithm.

FIG. 2 is a flow chart setting forth the general stages involved in a method 200 consistent with an embodiment of the invention for providing mode switching. Method 200 may be implemented using a computing device 400 as described in more detail below with respect to FIG. 4. Computing device 400 may comprise an operating environment for system 100 as described above. In particular, computing device 400 may be used by or within device 102. FIG. 3 is a diagram illustrating a mode switching algorithm 300 consistent with embodiments of the invention. Ways to implement the stages of method 200 will be described in greater detail below. Method 200 may begin at starting block 205 and proceed to stage 210 where computing device 400 may receive a selection of a non-native mode for a first input device having a native mode. For example, the user may choose pen mode from a ribbon displayed in screen 115 to assign the pen mode of operation to finger 120. Finger 120's native mode may comprise panning, thus assigning pen mode to finger 120 may be non-native.

From stage 210, where computing device 400 receives the selection of the non-native mode, method 200 may advance to stage 220 where computing device 400 may enable the use of the first input device in the selected non-native mode. For example, computing device 400 may enable the user to use finger 120 to ink (e.g. then non-native pen mode) on the page surface (e.g. screen 115.)

Once computing device 400 enables the use of the first input device in the selected non-native mode in stage 220, method 200 may continue to stage 230 where computing device 400 may detect a switch from the first input device to a second input device. The second input device may comprise, but is not limited to, a mouse, a pen, a finger, and a keyboard. For example, the user may stop using finger 120 to ink on the page surface and may switch to typing onto keypad 105. When the second input device is switched to, the second input device may be used in a native operating mode for the second input device.

After computing device 400 detects the switch from the first input device to the second input device in stage 230, method 200 may proceed to stage 240 where computing device 400 may detect a switch back to the first input device. For example, after typing onto keypad 105, the user may switch back to finger 120 and uses finger 120 as the input device. Consistent with embodiments of the invention, detecting the switch back to the first input device may not comprise computing device 400 detecting the use of a right mouse button on the first input device. Moreover, detecting the switch back to the first input device may not comprise computing device 400 detecting the use of an eraser on a pen comprising the first input device.

Once computing device 400 detects the switch back to the first input device in stage 240, method 200 may continue to stage 250 where computing device 400 may enable the use of the first input device in the native mode in response to detecting the switch back to the first input device. For example, as stated above, after typing onto keypad 105, the user may switch to finger 120 and uses finger 120 as the input device. In this situation, the application may switch to pan mode for finger 120 and allow panning with finger 120 rather than the previous inking mode of operation. In other words, because the user is switching back to finger 120 after using keypad 105, device 102 may enable the use of finger 120 in its native panning mode rather than the previously user selected non-native pen mode.

Consequently, embodiments of the invention, while they may allow all input devices to be used in different modes thus providing flexibility, embodiments of the invention may also takes care of common user cases including switching input devices frequently, switching between applications, returning to the application after a period of time without remembering mode choices made earlier, and ensures that the devices and modes behave in a non destructive and user predicted/natural fashion. Once computing device 400 enables the use of the first input device in the native mode in response to detecting the switch back to the first input device in stage 250, method 200 may then end at stage 260.

Consistent with embodiments of the invention, there may be exceptions to mode switching method 200 and mode switching algorithm 300. For example, with computing devices where it is not possible to differentiate between finger and pen (e.g. input devices,) embodiments of the invention may default to pan mode. In this case, the user may have to explicitly choose pen mode to start inking. Moreover, all hardware buttons may operate as-is. For example, if the user explicitly selected pan mode, then using the eraser on a Tablet Pen may not enable panning, but may continue to stroke erase. Similarly, a right click button may bring up a right click context menu and not be detected by the computing device to be a switch back. In other words, using these buttons may not be considered an input device change trigger to the auto-switching algorithm. Furthermore, detection of keyboard (e.g. keypad 105) input in any mode may switch the application back to "Stop Inking/Type" (e.g. Select & Type) in the Ink tab Write chunk (e.g. Draw tab Tools chunk) and allow text entry on the page surface (e.g. screen 115.) In addition, if the user explicitly has enabled/disabled the application wide options in the application, then this may override the mode switching process of mode switching method 200 or mode switching algorithm 300.

An embodiment consistent with the invention may comprise a system for providing mode switching. The system may comprise a memory storage and a processing unit coupled to the memory storage. The processing unit may be operative to receive a selection of a non-native mode for a first input device having a native mode and enable the use of the first input device in the selected non-native mode. In addition, the processing unit may be operative to detect a switch from the first input device to a second input device and to detect a switch back to the first input device. Moreover, the processing unit may be operative to enable the use of the first input device in the native mode in response to detecting the switch back to the first input device.

Another embodiment consistent with the invention may comprise a system for providing mode switching. The system may comprise a memory storage and a processing unit coupled to the memory storage. The processing unit may be operative to receive a selection of a non-native mode for a first input device having a native mode comprising an initial mode of operation assigned to the first input device when the computing device is first booted. The non-native mode may not comprise the initial mode of operation. The processing unit being operative to receive the selection of the non-native mode comprises the processing unit being operative to detect the selection of an indication of the non-native mode for the first input device from a ribbon displayed on a display associated with the computing device. Moreover, the processing unit may be operative to detect a switch from the first input device to a second input device and to detect a switch back to the first input device. Furthermore, the processing unit may be operative to enable the use of the first input device in the native mode in response to detecting the switch back to the first input device.

Yet another embodiment consistent with the invention may comprise a system for providing mode switching. The system may comprise a memory storage and a processing unit coupled to the memory storage. The processing unit may be operative to receive a selection of a non-native mode for a first input device having a native mode and to detect a switch from the first input device to a second input device. Furthermore, the processing unit may be operative to detect a switch back to the first input device and to enable the use of the first input device in the native mode in response to detecting the switch back to the first input device.

Figure 4:
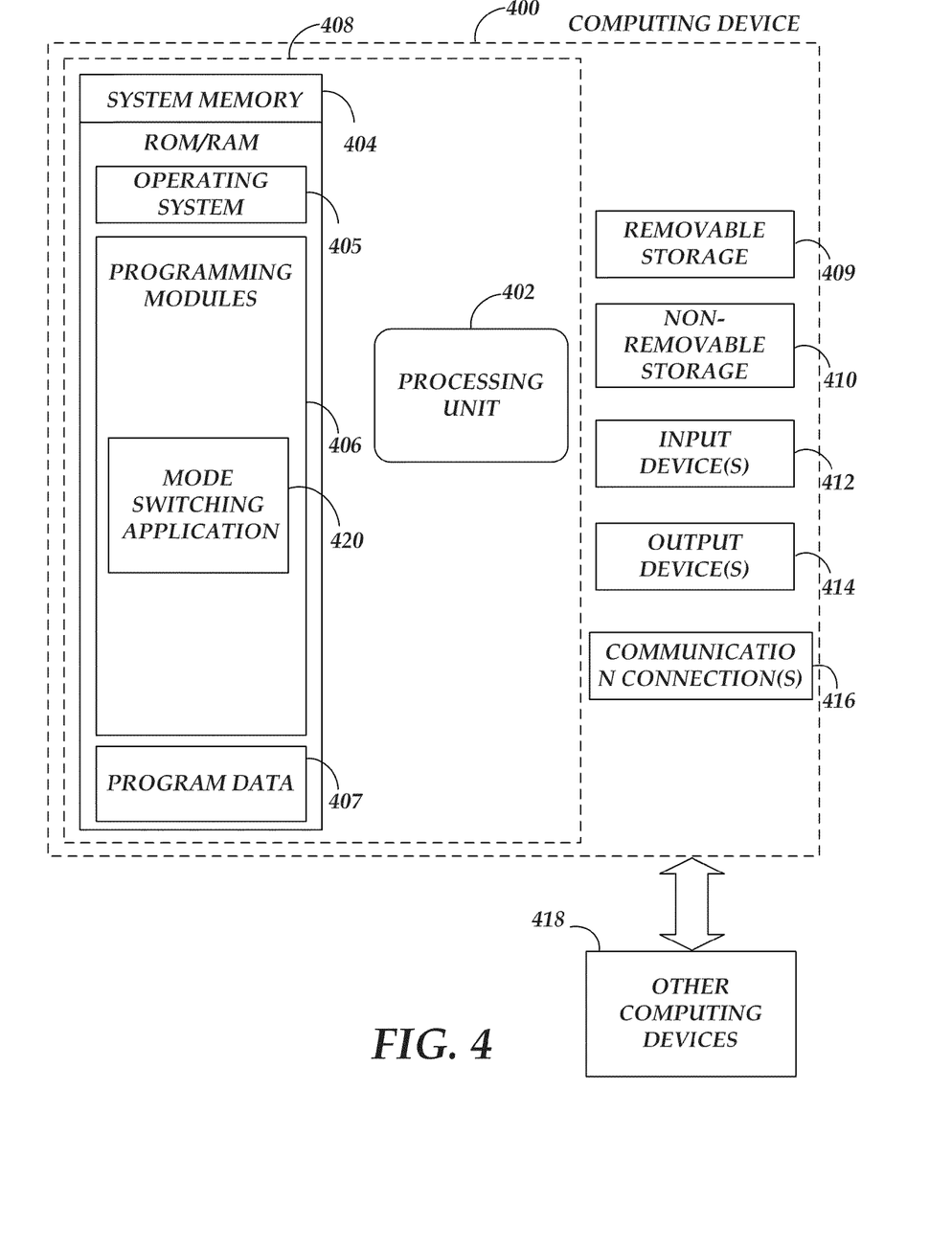
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400. For example, computing device 400 may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are examples and computing device 400 may comprise other systems or devices.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include, for example, a mode switching application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410.

Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Input devices 412 may comprise screen 115 activated in conjunction with finger 120 or pen 125. Output device(s) 414 such as a display, speakers, a printer, screen 115, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. mode switching application 420) may perform processes including, for example, one or more method 200's stages as described above (or algorithm 300, for example, as shown in FIG. 3.) The aforementioned processes are examples, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing mode switching, the method comprising:
   receiving, by a computing device, a selection of a non-native mode for a first input device having a native mode;
   enabling, by the computing device, the use of the first input device in the selected non-native mode;
   detecting, by the computing device, a switch from the first input device to a second input device;
   detecting, by the computing device, a switch back to the first input device; and
   enabling, by the computing device, the use of the first input device in the native mode in response to detecting the switch back to the first input device, wherein enabling the use of the first input device in the native mode comprises enabling the use of the first input device in the native mode upon determination that the switch to the second input device did not comprise a usage of a hardware button on the second input device.

2. The method of claim 1, wherein receiving, by the computing device, the selection of the non-native mode for the first input device having the native mode comprises receiving the selection of the non-native mode for the first input device having the native mode comprising an initial mode of operation assigned to the first input device when the computing device is first booted.

3. The method of claim 1, wherein receiving, by the computing device, the selection of the non-native mode for the first input device having the native mode comprises receiving the selection of the non-native mode for the first input device wherein the non-native mode does not comprise an initial mode of operation assigned to the first input device when the computing device is first booted.

4. The method of claim 1, wherein receiving, by the computing device, the selection of the non-native mode for the first input device having the native mode comprises detecting, by the computing device, the selection of an indication of the non-native mode for the first input device from a ribbon displayed on a display associated with the computing device.

5. The method of claim 1, wherein receiving, by the computing device, the selection of the non-native mode for the first input device having the native mode comprises receiving the selection of the non-native mode for the first input device having the native mode comprising one of the following: ink mode, pan mode, and text mode.

6. The method of claim 1, wherein receiving, by the computing device, the selection of the non-native mode for the first input device having the native mode comprises receiving the selection of the non-native mode comprising one of the following: cursor mode, ink mode, pan mode, and text mode.

7. The method of claim 1, wherein receiving, by the computing device, the selection of the non-native mode for the first input device having the native mode comprises receiving the selection of the non-native mode for the first input device comprising one of the following: a mouse, a pen, a finger, and a keyboard.

8. The method of claim 1, wherein detecting, by the computing device, the switch from the first input device to the second input device comprises detecting the switch from the first input device to the second input device comprising one of the following: a mouse, a pen, a finger, and a keyboard.

9. The method of claim 1, wherein receiving, by the computing device, comprises receiving, by the computing device comprising one of the following: a mobile terminal, a smart phone, a cellular telephone, a wireless telephone, a personal digital assistant (PDA), an intelligent pager, a portable computer, a hand held computer, a conventional telephone, and a facsimile machine.

10. The method of claim 1, further comprising, receiving, by the computing device, input to disable enabling the use of the first input device in the native mode in response to detecting the switch back to the first input device.

11. The method of claim 1, wherein detecting, by the computing device, the switch back to the first input device does not comprise the computing device detecting the use of a right mouse button on the first input device.

12. The method of claim 1, wherein detecting, by the computing device, the switch back to the first input device does not comprise the computing device detecting the use of an eraser on a pen comprising the first input device.

13. The method of claim 1, wherein receiving, by the computing device, the selection of the non-native mode for the first input device having the native mode comprises receiving the selection of the non-native mode for the first input device having the native mode comprising pan mode when the first input device is one of the following: a finger and a pen and when the computing device is incapable of differentiating between a finger and a pen.

14. A computer-readable storage medium that stores a set of instructions which when executed perform a method for providing mode switching, the method executed by the set of instructions comprising:
receiving, by a computing device, a selection of a non-native mode for a first input device having a native mode comprising an initial mode of operation assigned to the first input device when the computing device is first booted wherein the non-native mode does not comprise the initial mode of operation, wherein receiving the selection of the non-native mode comprises detecting the selection of an indication of the non-native mode for the first input device from a ribbon displayed on a display associated with the computing device;
detecting a switch from the first input device to a second input device, wherein detecting the switch from the first input device to the second input device comprises one of the following:
detecting a first type of device usage, and
detecting a second type of device usage;
detecting a switch back to the first input device;
persisting the use of the first input device in the non-native mode in response to detecting the first type of device usage; and
enabling the use of the first input device in the native mode in response to detecting the second type of device usage.

15. The computer-readable storage medium of claim 14, wherein receiving, by the computing device, comprises receiving, by the computing device comprising one of the following: a mobile terminal, a smart phone, a cellular telephone, a wireless telephone, a personal digital assistant (PDA), an intelligent pager, a portable computer, a hand held computer, a conventional telephone, and a facsimile machine.

16. The computer-readable storage medium of claim 14, further comprising, receiving by the computing device, input to disable enabling the use of the first input device in the native mode in response to detecting the switch back to the first input device.

17. The computer-readable storage of claim 14, wherein detecting the first type of device usage comprises the computing device detecting the use of a right mouse button.

18. The computer-readable storage of claim 14, wherein detecting the second type of device usage comprises the computing device detecting the use of an eraser on a pen.

19. The computer-readable storage medium of claim 14, wherein receiving, by the computing device, the selection of the non-native mode for the first input device having the native mode comprises receiving the selection of the non-native mode for the first input device having the native mode comprising pan mode when the first input device is one of the following: a finger and a pen and when the computing device is incapable of differentiating between a finger and a pen.

20. A system for providing mode switching, the system comprising:
a memory storage; and
a processing unit coupled to the memory storage, wherein the processing unit is operative to:
receive a selection of a non-native mode for a first input device having a native mode;
detect a switch from the first input device to a second input device;
detect a switch back to the first input device; and
enable the use of the first input device in the native mode in response to a determination that the switch to the second input device did not comprise one of the following: a right mouse button click and an eraser usage on a pen.

* * * * *

UNITED STATES PATENT AND TRADEMARK OFFICE
CERTIFICATE OF CORRECTION

PATENT NO. : 8,214,546 B2  Page 1 of 1
APPLICATION NO. : 12/607249
DATED : April 17, 2012
INVENTOR(S) : Vasudevan et al.

It is certified that error appears in the above-identified patent and that said Letters Patent is hereby corrected as shown below:

In the Claims

Column 10, line 27, Claim 17, after "storage" insert -- medium --.

Column 10, line 30, Claim 18, after "storage" insert -- medium --.

Signed and Sealed this
Third Day of February, 2015

Michelle K. Lee
*Deputy Director of the United States Patent and Trademark Office*